Aug. 20, 1957 — O. B. VETTER — 2,803,136
CORRECTION SIGNAL GENERATOR FOR MEASURING APPARATUS
Filed Nov. 27, 1953 — 3 Sheets-Sheet 1

Inventor
Otto B. Vetter
by Kegan & Kipnis Attys.

Aug. 20, 1957 — O. B. VETTER — 2,803,136
CORRECTION SIGNAL GENERATOR FOR MEASURING APPARATUS
Filed Nov. 27, 1953 — 3 Sheets-Sheet 3

Inventor
Otto B. Vetter
by Kegan & Kipnis
Attys.

United States Patent Office 2,803,136
Patented Aug. 20, 1957

2,803,136

CORRECTION SIGNAL GENERATOR FOR MEASURING APPARATUS

Otto B. Vetter, McKeesport, Pa., assignor to Hagan Chemicals & Controls, Inc., a corporation of Pennsylvania Application November 27, 1953, Serial No. 394,770

3 Claims. (Cl. 73—345)

This invention relates to apparatus for generating properly computed and corrected signals from a variety of measuring impulses derived from large air flows or the like, for the purpose of applying such signals to controlling, registering and other supervisory functions connected with the flow or other operation in question. Briefly the device may be referred to as a correction signal generator or as a signal computing, correcting and transmitting device.

Modern research conditions, particularly in aeronautical testing laboratories and the like, have given rise to a definite need for simplification and correlation of the data receiving, processing and utilizing instrumentalities, the complexity of which would otherwise become forbidding. For instance, where aircraft flight conditions are simulated, controlled dynamic forces are produced by air flows supplied to stationary chambers or cells housing the equipment under test. Air is circulated to such chambers or cells in a wind tunnel system. The air flow supplied to a chamber usually must be measured continuously as to mass or volumetric rates, velocity, pressure, temperature and sometimes other conditions, for which purposes well known flow nozzles, bulbs and other elements are employed. Under testing conditions wide ranges of flow must be established and must frequently be varied at different rates of change in order to simulate speed and other flying characteristics; likewise extremely wide ranges of temperature and pressure are required to simulate the different altitude conditions. Simple tests are conducted under a static set of flow conditions while more complicated tests are frequently required under transient conditions in order to simulate different rates of climb and drive and other operations. In such latter events it is particularly important to continuously register the flow or flows corrected for a number of variables and also for certain functions of such variables, for correlation with still other data taken manually or automatically during the tests and sometimes for the control of various types of equipment. For such purposes of registration and mainly control it is important and sometimes imperative that there be provided a continuously corrected composite flow signal obtained by superimposing signals resulting from a plurality of sensing and computing devices. When the signal so derived is used in a feed back control system applied to the measured flow itself, there is initiated thereby a testing cycle, the characteristics of which may be such that practically no other supervisory method is available than that generally outlined above. In other cases abundant time would be available, but it would be tedious and practically impossible to derive all of the necessary functions continuously except by an impulse processing arrangement as generally described.

Component parts, having possible or outstanding utility in such a system, are well known to the art, but it is belived that the novel combination of such components to be described herein represents a concept not heretofore used or proposed. This combination as particularly illustrated in the following, subject to detail changes as will be obvious to persons skilled in the art, incorporates: (1) elements to receive two or more measured variable input functions, each of which may and usually will vary as a nonlinear, exponential or otherwise characterized derivative of a basic variable such as air, temperature or air pressure; (2) elements to convert such measured variable input functions into representative linear motions; and (3) means for multiplying or dividing so received and converted functions by one another in order thereby to produce the input function for a final and most important stage of (4) feeding the so derived product or quotient to and through a signal transmission stage and thereby (5) feeding it either to a single or master registry or supervisory stage independent of the flow or other condition from which the input function was derived or in other cases feeding it back thereto for control purposes. The register or control device to which the signal is transmitted may be remote from the receiving, converting, multiplying and transmitting instrument or adjacent thereto or actually within one and the same instrument housing therewith. In these respects the new arrangement is very flexible; likewise, as already indicated, it is flexible as to the correlation of sources and targets of impulse and signal. It may further be noted that all or some of the impulses or signals may either be electric or pneumatic or sometimes hydraulic.

The details of this new combination and the manner in which it facilitates the research tests or other operations for which it is designed will be understood more clearly upon a study of the detailed description of preferred embodiments which follows, in conjunction with the drawing appended hereto wherein such embodiments are diagrammatically shown so far as necessary for present purposes. It will be understood that a number of specific details of such showing are subject to radical changes, without impairment of the basic objectives and structures hereof.

Figure 1:
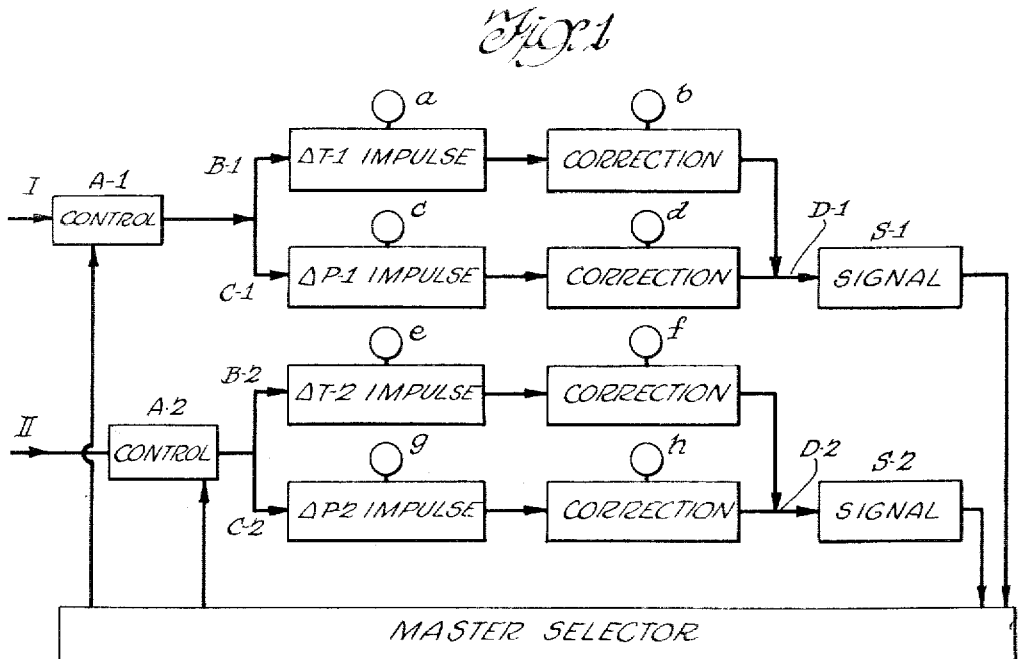
Figure 1 is a purely schematic representation of the manner in which control, impulse, correction, signal, etc. are correlated in a relatively simple control system utilizing the present apparatus.

Referring first to Figure 1, there are shown two air flows I and II which may pass through parallel conduits, equipped with "control" units A–1, A–2 respectively, for instance with balanced damper systems or the like. Frequently such parallel conduits are valved so that the flow range in each is proportioned to the measuring range of a specific instrument; the total flow range used in a chamber being often greater than the measuring range of any one instrument that can be built and operated with the required accuracy.

From the flow I there is derived, by route B–1, what is designated as a "delta T–1 impulse" or impulse derived from a change or difference (delta) of air temperature (T–1); likewise, by route C–1, a "delta P–1 impulse" or impulse derived from a pressure change. Next, a "correction" must usually be applied each impulse, because of predetermined nonlinear responses of sensing instruments, such as thermometer probes and Pitot tubes and/or because of other factors, such as the need for extraction of a square root or other exponential function to convert a (differential) pressure reading into velocity or quantity data, or the like. The uncorrected and corrected temperature measurements desirably can be checked by gauges $a$ and $b$ respectively, and likewise the uncorrected and corrected pressure or pressure derivative measurements can be checked by gauges $c$ and $d$ respectively. Some of these gauges, mainly $d$ may also be connected with integrators such as that described in Patent No. 2,376,108 of M. J. Zucrow. The corrected readings are then combined for instance by dividing delta T by delta P, schematically this is shown at D–1. The combined readings, for instance the quotient delta T over delta P is desirably indicated at this stage, and is next utilized to generate therefrom a corresponding "signal" S–1.

Likewise the flow II yields, via B–2, $e$ and $f$, a corrected delta T–2 impulse and via C–2, $g$ and $h$, a corrected delta P–2 impulse and these impulses are combined at D–2 and used to generate another "signal" S–2.

Each signal S–1, S–2 (and often many additional signals, generated in more or less similar ways) can be applied by a "master selector," the details of which form no object of this invention, to a "master register I" and/or "master register II" and/or "control" A–1 or A–2, in flow I or II, as may be required by the test plan; and often, such applications may be much more complex. It will thus be seen that practically the detail indications $a, b \ldots g, h$, S–1, S–2, etc. in such a system can merely be handled as matters of maintenance or occasional check-up, and that vital importance must be given to the master units (registers and controls in a broad sense) and to the signal generators S–1, S–2, etc., supplying such master units with suitable data. Thus the generation of a suitably corrected and combined signal S–1, S–2, etc. is one of the main objects of this invention and the pertinent apparatus components are among the main parts of the instrumentation unit. Basically, such a unit or combination may be considered as comprising, for instance, the elements B–1, $a$, $b$, C–1, $c$, $d$, D–1 and S–1 and the parts directly connected with each of these elements; mainly the "signal" part directly connected with the element S–1.

Figure 2:
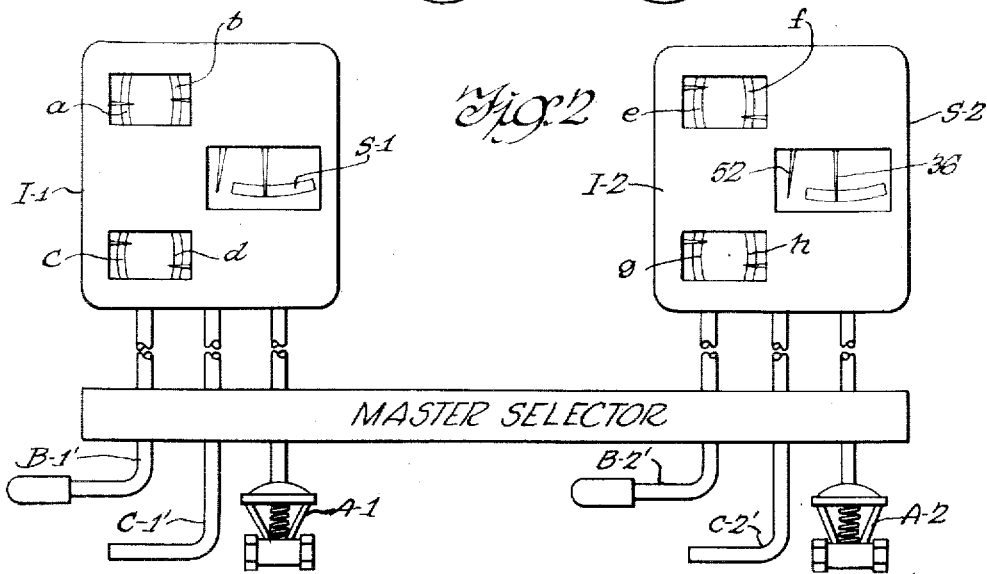
Figure 2 is a somewhat more particularized, but still highly schematic view of a similar, but slightly modified system.

Referring now to Figure 2, a similar system is here shown with the different indicators $a, b \ldots g, h$, S–1, S–2, being illustrated in such approximate space relationship as they may actually have in preferred types of instrument units I–1, I–2. Further, the ducts B–1', B–2' carrying temperature impulses to these instrument units are schematically shown as provided with thermometer probes, while Pitot tubes are shown on the pressure ducts C–1', C–2'. The "control" units A–1, A–2 are shown as diaphragm motor valves. Their control connections and also the lines B–1', B–2', C–1', C–2' are here shown as controllable by a master selector. Thus a common computor signal like S–1 can be derived from flow I and/or II and can be applied to either of these flows and/or some master register (including, if necessary, a master indicator, recorder, integrator, computor, and/or other instruments).

For most aeronautical testing applications, the computing device B–1, C–1 ... D–1, S–1 must register and/or develop a signal directly or inversely proportional to the square root of delta T over the square root of delta P, where T and P are absolute temperature and pressure respectively. In the case of direct proportionality, the resultant output signal can be superimposed on a differential measuring instrument which registers the square root of the differential head to obtain an end result in terms of volumetric flow or of flow velocity. In the case of inverse proportionality, the end result can be expressed in terms of mass rate flow. The device can also be employed to compute ratios or products of other variables, such as density, specific gravity, etc., by employing suitable types of measuring elements.

Figure 3:
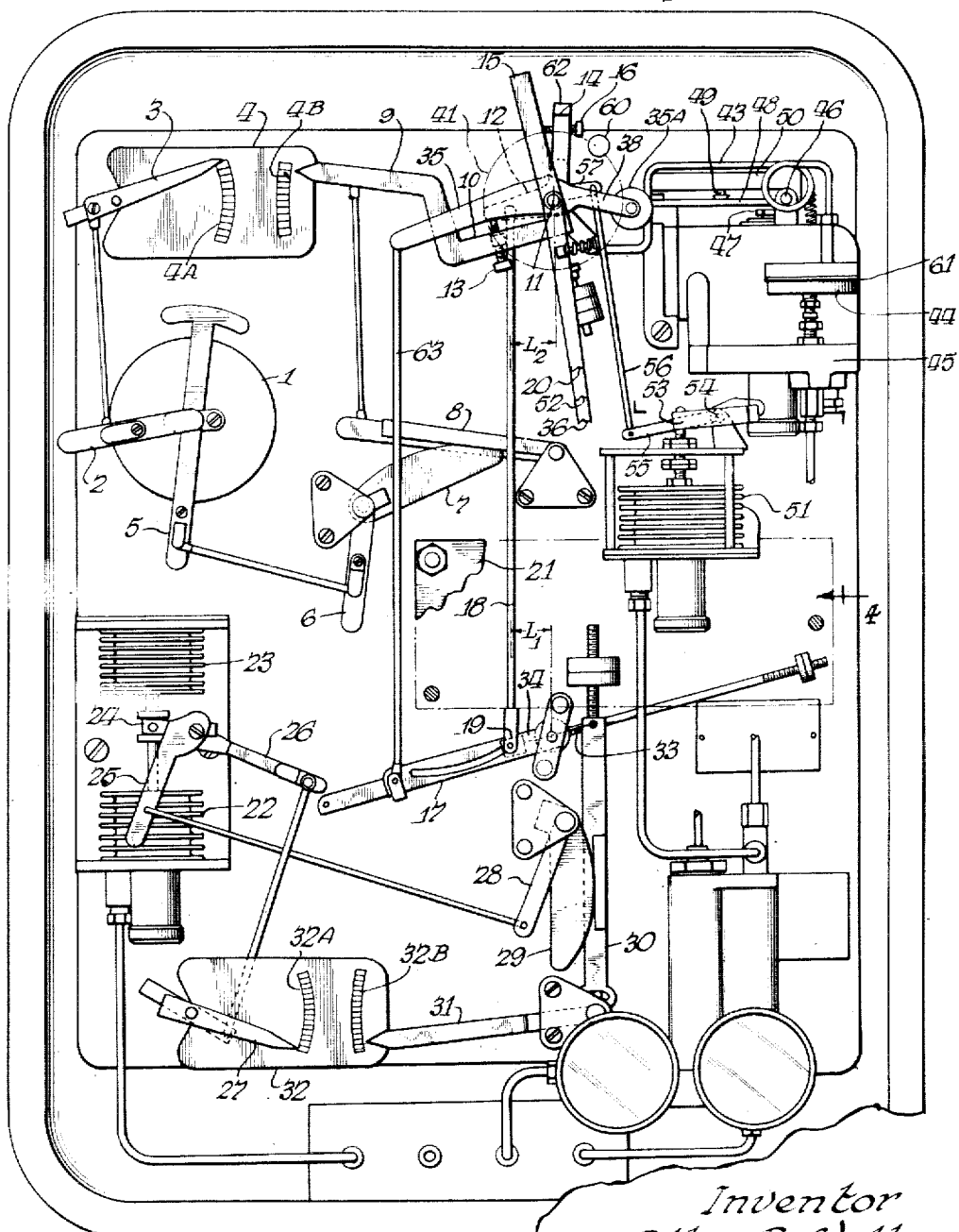
Figure 3 is a front view of the principal part of the system of Figure 2, with certain portions removed in order to reveal others.
Figure 4:
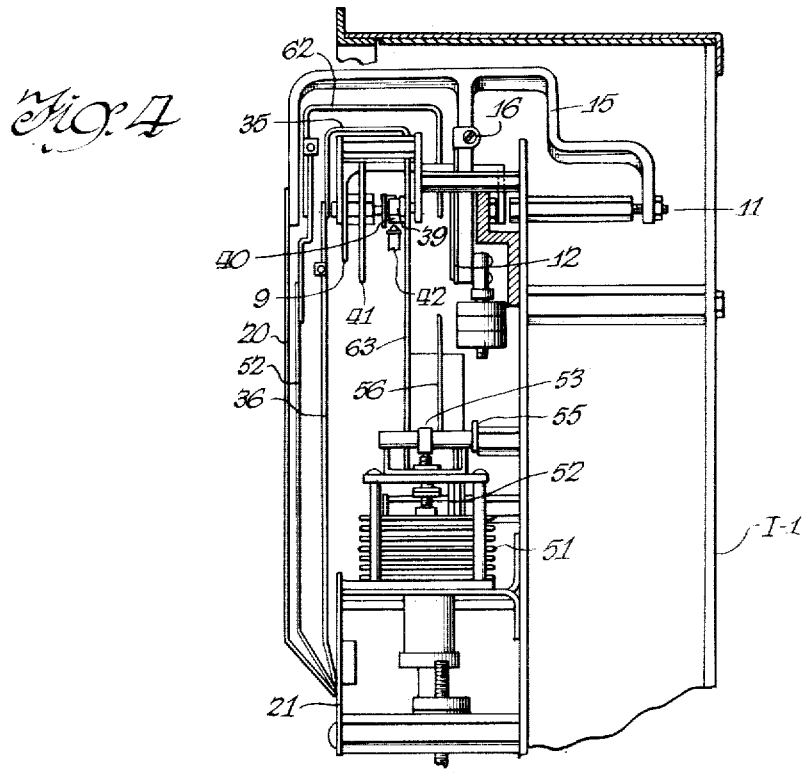
Figure 4 is a side view of the apparatus of Figure 3.

Referring now to Figures 3 and 4, the computing device is here arranged to register and produce a pneumatic output signal of a resultant which is equal to the square root of delta T over the square root of delta P.

The measuring element 1 responds to changes of temperature (delta T Impulse) at the point of measurement. There results a rotary motion of the element 1 which is imparted to arm 2. This is linked to the pointer arm 3 of a dial assembly 4. The motion of element 1 is also imparted to an arm 5 which is shown as linked to a depending arm 6 of a bell crank having a second more or less horizontal arm 7. This arm 7 has a cam-shaped profile on its upper edge, which is suitable to impart a motion to a further arm 8 rockingly contacted thereby, so that the motion of arm 8 is linear respective to the exponential power function of the temperature variable received in element 1. The dial unit 4 has two scales 4A, 4B. The first scale 4A is graduated in degrees of temperature to indicate the measured variable. The second scale 4B is graduated for linear values of the square root or other exponential power of the measured variable, and is read in conjunction with a pointer 9 which is linked to the cam follower arm 8. The latter scale 4B provides a reference means for checking the conversion means 7, 8. The converted motion arm 9 has an offset portion 10 to avoid interference with other parts, to be described later. It is journalled about a pivot 11. Its motion is also imparted to another arm 12 journalled at 11, which is variably angularly spaced from arm 9 by a screw adjustment member 13 in offset portion 10 to provide a calibrating means. The arm 12 forms a bellcrank with arm 14. Their bearing 11 is located in a beam 15, and they are variably attached to the beam 15 by an adjustable screw 16 to provide a further calibrating means. The angular motion of assembly 9, 12, 14 pivoting about the bearing center 11 is downwardly transmitted to the beam member 17 of a dividing element, by a link 18 and slidable crosshead 19. Said angular motion is also transmitted to a pointer and/or pen 20 playing over a scale and/or chart 21 by means of linkage 15.

The pressure variable Delta P is sensed by a separate bellows element 22, and when it is necessary that the computation is to be made on the absolute pressure basis, a second, evacuated bellows element 23 is employed to obtain a zero pressure reference. The elements 22, 23 are interconnected at the free ends, so that their conjoint movement, by conventional crosshead means, is transmitted to an approximately horizontal arm 24 which forms a double bellcrank with a depending arm 25 and a more or less horizontal arm 26. The arms 25 and 26 are radially adjustable relative to arm 24 for calibrating purposes. The arm 26 is linked to an arm of the beam 27 which also incorporates an adjustable pointer. The other arm 25 is linked to an arm 28 which forms a bellcrank with a second cam arm 29. The edge of this cam is profiled so that the output motion of its follower arm 30 will reflect the proper, predetermined power of the pressure variable—frequently its square root—as a linear motion. Such motion is reflected by a pointer 31 over a dial 32 cooperating also with the pointer 27. The latter plays over a scale 32A while pointer 31 plays over a scale 32B of this dial.

A cable 33 connects the arm 30 with the crosshead 19 in the manner known from my Patent No. 2,524,241. This connection here serves to multiply the square root of delta T with the reciprocal of the square root of delta P, that is, to derive the quotient of delta T over delta P. This quotient appears as the resulting motion imparted to an arm 34 by the beam 17. The quotient is a function of the angular displacement imparted to the beam 17 by the temperature variable through the crosshead 19, link 18, arms 12, 9, 8, 7, 6 and 5, and by the pressure variable which positions the crosshead 19 to vary the ratio of the lever length $L_1$ of arm 34 with relation to the constant length L–2 of drive arm 12. The crosshead is guided in arcuate slots in beam 17 and is urged to the left by a coil spring. It is pulled to the right by means of the cable 33, arms 30, 29, 28, 25 and 24. The resultant motion imparted to arm 34 is transmitted to a beam member 35 which pivots coaxially with the other beams, and to a register arm 36 which registers the resultant on the scale or chart 21.

The computing coupling 17, which is here in effect arranged to divide delta T by delta P, is basically the same as the coupling employed to multiply, which is disclosed in said Patent No. 2,524,241. In cases where it is arranged to multiply the two variables, the order of the arms 34 and 12 (together with the links 63 and 18 connecting said arms to the coupling beam and the crosshead 19, respectively) is interchanged so that the one input variable actuates the beam 17 by means of the present arm 34 and link 63 and the arm 12 is positioned by means of link 18 connecting the arm with the crosshead 19. In the alternate order, the present arm 34 becomes a member of the beam 15 and the present arm 12 becomes a member of the beam 35. Also, in the inverse order, it is required to reverse the motion sequence of one variable, for instance, change the pivot point of the double bellcranks 24, 25, 26 to the opposite side of the element pushrod, so that arm 25 will be rotated oppositely for a given change. Either arrangement can be conveniently used with the present instrument. The choice of the sequence of operation depends primarily on the relative amplitude of the two variables and the type of elements required to sense them. The type of transmission to register the resultant at a remote point may also become a factor.

The scales of the input variable dials 4 and 32 may be graduated in absolute units, and their ranges will usually be confined to the actual operation range for a typical application. Generally, in flow metering practice, corrections for pressure and temperature are made from the absolute zero base. Normally, the operating ranges are well above the zero reference, and the exponential power of the function is such that the cams 7 and 29 and the cam followers are not required to convert motions in the low values where a high degree of motion multiplication is required. When, on the other hand, extreme conditions are encountered, in aeronautical testing or the like, the absolute pressure simulating a 75,000 foot altitude condition is approximately 1" of mercury absolute; the conversion is a half-power function, and in this case, the cam slope in the low pressure range would be very steep to produce the required converted motion. If the input motion reached the zero value, the cam arm would have to extend to the pivoting center of its follower. Due to this mechanical limitation, when applications operating in the low ranges are encountered, the present pressure element 22, 23 may best be replaced by a ring balance type element (not shown) as known from the earlier patents cited herein. Spring loading may then be employed with a cam arrangement which will allow the power conversion down to a zero value. The cam follower motion of such a ring balance meter would be linked to arm 30. The ring element can be connected to subject the pressure variable to one ring compartment and to evacuate the other compartment continuously with a vacuum pump, so as to compensate it for barometric changes.

Reference will now be made more particularly to the signal generating and transmitting means incorporated in each instrument I-1, I-2, etc. and schematically shown at S-1, S-2, etc. in Figure 1. In Figure 3, particular reference is made to the upper right-hand corner of the instrument as there illustrated (also see Figure 4).

The beam 35, pivoted at 11, comprises an arm 38 provided with a short horizontal pin 39 parallel with the axis of the pivot 11. This pin 39 supports the free end of a baffle member 40, the opposite end of which is pivoted to a carrier most conveniently provided by a circular gear 41 centered about the pivot 11. The gear is normally stationary. However, a pinion 60 is provided in mesh with it to allow adjustment of the position of the stationary gear 41 for calibration of the signal generating mechanism.

This mechanism is pneumatic and basically of the well known flapper valve type which, however, is here incorporated in novel manner. The baffle 40 is variably positioned by the arm 38 and indirectly by the lever 35 reflecting the movements of the lever 17, with respect to a nozzle 42 on a tube 43 supplied with air at a constant volume rate from a source (not shown). A variable back pressure is thus created, which is applied to and sensed by a diaphragm 61 in a diaphragm chamber or element 44.

Variable forces are thus applied to the diaphragm 61 and these forces are employed to operate a relay valve 45 which regulates the pressure of a second air stream from a common supply (not shown), so that the back pressure and diaphragm force are amplified; and preferably the pressure produced in the relay valve is kept in inverse ratio to the back pressure in the nozzle tube 43, in well known manner. The resultant pressure from the relay valve is applied by the push rod 47 of said valve to a feed back adjustment of the position of the nozzle 42 at the free end of the nozzle tube 43; for compensating purposes, known to the art. The push rod 47 engages a flexible cantilever spring member 48 which by means of an adjustable fulcrum member 49 engages a beam 50, pivoted at 46 and having a free end supporting the nozzle 42. The tube 43 of that nozzle is made flexible by being coiled about the pivot 46. By means of this nozzle arrangement, the output signal pressure in the relay valve 45 is inversely proportional with the position of the arm 38 positioning the baffle 40, with a degree of yieldability adjustable at 49. Such signal pressure is then applied to registering or controlling or other devices as described above by obvious duct means (not shown).

In order to substantiate that the device is functioning properly in every respect, it is desirable to register a mechanical equivalent of the transmitted pneumatic signal in addition to the other indications provided by the dials 4 and 32. Therefore the pressure prevailing in the relay valve 45 is impressed on a further bellows element 51, the motion of which is transmitted to a follower beam 62 pivoted about the beam center 11, which incorporates a pointer 52 playing over the same scale 21 as the pointer 36 which is rigid with the lever yoke 35 and shows the magnitude of the computed signal by purely mechanical means. The transmission from the bellows 51 is effected by an arm 53 engaged by the bellows push rod; this arm being pivoted at 54. Another arm 55 forms an adjustable bellcrank therewith and a link 56 connects the arm 55 to an approximately parallel arm 57 which is rigid with the beam 62.

It will be noted that the baffle 40, nozzle 42 and parts positioning these two members form a sensitive impulse receiver and amplifier with yieldable feedback, for the mechanically, continuously and instantaneously derived computation of the value to be transmitted. It will be understood by persons skilled in the art that the pneumatic amplifier described can be replaced by electric means, for instance of the potentiometer type, the movable arm of which can be linked to the arm 38 of the beam 35 in obvious manner to control the input resistor element in an amplified circuit, the output of which can be transmitted to registering, controlling and other means in the same manner as has been described.

Figure 5:
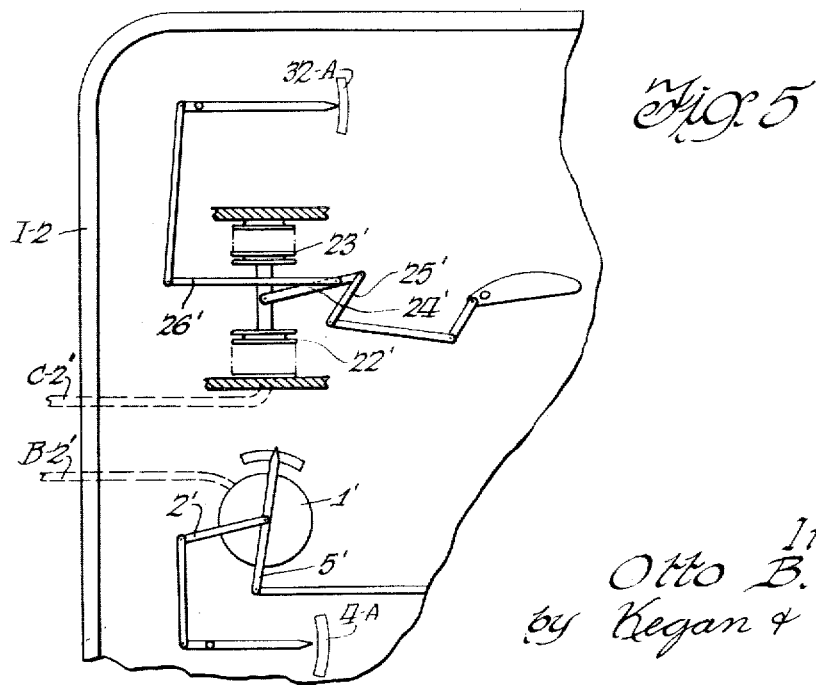
Figure 5 is a fragmentary front view generally similar to Figure 3, but showing a slightly modified device.

Another modification is illustrated in Figure 5. Another arrangement is shown in accordance with which a corrected pressure impulse can be multiplied rather than divided by a corrected temperature impulse or vice versa. In the particular arrangement of Figure 5 the position of the elements 1', 22' and 23' is reversed, as compared with the showing of Figure 3. In the case of multiplying arrangement the position of these elements is mainly a mere matter of convenience; for instance, it is possible to provide an arrangement wherein that variable which has the broadest range of variation is placed in the upper location in the instrument. In the case of division, of course, it becomes significant whether the arm 9, arm 12, link 18, etc. are controlled by the pressure sensitive or the temperature sensitive element, depending on whether a delta P over delta T function, or the reciprocal thereof is to be derived.

Figure 5 shows also the links attached to the arms 5 and 26 of the temperature and pressure elements respectively, and it will be noted that that link which by means of interposed cam action or sliding action controls the position of the multiplier arm 30, can engage that arm in the manner shown in Patent No. 2,524,241 rather than the manner of Figure 3 hereof, dependent upon the types of variables to be transmitted to and through this multiplier arm and their required multiplication or division.

Still further modifications no doubt will occur to persons skilled in the art upon a study of this disclosure.

I claim:

1. Apparatus for continuously generating a control signal reflecting a ratio or product of measurement impulses, comprising: a first reciprocable actuator means connectable with a first sensitive element and linearly movable in accordance with conditions measured thereby; means to indicate the position of the first actuator means; a second reciprocable actuator means connectable with a second sensitive element and linearly movable in accordance with conditions measured thereby; means to indicate the position of the second actuator means; mechanical multiplier linkage to continuously and instantaneously multiply a function of the position of the first actuator means by a function of the position of the second actuator means; a beam to indicate the product so derived; a source of air pressure; a flexible duct connected to said source; a nozzle connected to said duct and adapted to discharge a stream of air therefrom; a baffle variably interposed on said stream; mechanical linkage movable by said beam to continuously and instantaneously position said baffle so that the pressure in said duct responds to said product with yieldability; means to amplify the pressure in said duct; and feedback means responsive to said pressure and adapted to move said nozzle to adjust said yieldability.

2. Apparatus as described in claim 1 wherein the feedback means responsive to said pressure and adapted to move said nozzle comprises a diaphragm, a rod movable thereby, and mechanical means for indicating the position of the rod.

3. Apparatus as described in claim 2 wherein said feedback means comprises adjustably yieldable linkage between said diaphragm and said nozzle adapted to compensate for the variable positioning of said baffle.

References Cited in the file of this patent

UNITED STATES PATENTS

| | | |
|---|---|---|
| 2,217,642 | Luhrs | Oct. 8, 1940 |
| 2,222,551 | Ziebolz et al. | Nov. 19, 1940 |
| 2,257,905 | Gorrie | Oct. 7, 1941 |
| 2,601,777 | Woodward | July 1, 1952 |
| 2,662,757 | Mock | Dec. 15, 1953 |

UNITED STATES PATENT OFFICE

CERTIFICATE OF CORRECTION

Patent No. 2,803,136 August 20, 1957

Otto B. Vetter

It is hereby certified that error appears in the printed specification of the above numbered patent requiring correction and that the said Letters Patent should read as corrected below.

Column 1, line 47, for "drive" read -- dive --; column 2, line 7, after "air", first occurrence, strike out the comma; column 4, line 75, for "L-2" read -- $L_2$ --.

Signed and sealed this 26th day of November 1957.

(SEAL)
Attest:
KARL H. AXLINE
Attesting Officer

ROBERT C. WATSON
Commissioner of Patents